2,754,298
PRODUCTION OF LACTAMS AND AMIDES

Cyril Barnett, Irene Marianne Cohn, and James Lincoln, London, England, assignors to British Celanese Limited, a British company No Drawing. Application August 18, 1953, Serial No. 375,046

Claims priority, application Great Britain September 25, 1952

18 Claims. (Cl. 260—239.3)

This invention relates to improvements in chemical transformations and is more particularly concerned with the production of cyclic or acyclic amides from the corresponding ketones.

As is well known, amides may be formed from cyclic or acyclic ketones by first forming the oxime of the ketone by treatment with hydroxylamine sulphate, hydroxylamine hydrochloride or the like, and then treating the oxime with sulphuric acid, oleum, chlorsulphonic acid, phosphorus pentachloride or like strongly acid reagents according to the Beckmann process so as to convert the oximes into amides which are cyclic lactams if the starting material is a cyclic ketone. This process has found its greatest commercial application in the production of caprolactam from cyclohexanone by first forming the oxime and then transforming it to the lactam. A well known process for this commercial production consists in treating cyclohexanone with hydroxylamine sulphate, neutralising the resulting mixture, for example with ammonia, decanting or otherwise separating the oxime and then treating the separated oxime with concentrated sulphuric acid or oleum. When the transformation is complete the acid liquor is neutralised with ammonia or caustic soda or caustic potash and the resulting sulphate crystallised from the reaction liquor so as to leave substantially only the lactam in the liquor. Commercially it is advantageous to neutralise with ammonia because the resulting ammonium sulphate can be sold as fertiliser and therefore does not represent a complete loss both of the sulphuric acid and the neutralising agent. It will thus be seen that there are two stages of neutralisation in both of which sulphuric acid is neutralised and therefore rendered unsuitable for further use in the process and in both of which the neutralising agent is used up.

A single-stage process of converting the cyclohexanone to caprolactam or of converting another ketone to the corresponding amide is attractive but difficulties are encountered because hydroxylamine sulphate or similar salt, sulphuric acid or other reagent for the Beckmann transformation and cyclohexanone or other ketone do not give a homogeneous mixture and hence it is difficult to maintain uniform conditions during the transformation, and furthermore the reaction time has to be prolonged, probably due to the heterogeneity of the reaction mixture.

We have found that considerable advantages accrue from carrying out the reaction in a medium such as acetic acid, a chlorinated acetic acid, acetic anhydride or a mixture thereof which dissolves both the hydroxylamine sulphate or other hydroxylamine salt, the cyclohexanone or other ketone and any additional sulphuric acid or other Beckmann reagent which is used. With such a medium the reaction mixture may be homogeneous from the beginning or from very shortly after the reaction, and in consequence, if the reaction is carried out using Beckmann transformation temperatures from the beginning, it may be completed in a very short time, for example in 7–15 minutes, thus eliminating entirely the tedious operation of forming the oxime, separating it and separately subjecting it to the Beckmann transformation. In addition, any sulphuric acid introduced in the form of a salt with the hydroxylamine is not neutralised and so is available for the Beckmann transformation, thus cheapening the process. Finally, by carrying out the reaction in such a medium, smaller quantities of sulphuric acid or other agent for the Beckmann transformation may be employed than appear to be requisite in the case of carrying out a one-stage reaction between hydroxylamine sulphate, cyclohexanone and free sulphuric acid without the acetic acid, chloracetic acid or the like.

It seems probable that during the course of the reaction, and probably in the very early stages, either the acetic acid or the acetic anhydride, if used, transforms the hydroxylamine into acethydroxamic acid or the acetate thereof. Indeed we have successfully carried out the reaction by starting with acethydroxamic acid acetate. This use of a hydroxamic acid or an acyl derivative thereof constitutes a further novel feature of the invention and may be applied to the transformation of cyclohexanone or other ketone into the lactam or other amide, whether or not there is intermediate separation of the oxime. Instead of acethydroxamic acid or its acetate, other suitable hydroxamic acids may be used, for example such as can be obtained by the treatment of a hydroxylamine salt with the ethyl esters of the chloracetic acids, with or without acetic anhydride. The acethydroxamic acid or its acetate or other hydroxamic acid or acyl derivative thereof may thus be previously produced and reacted with the ketone according to the present invention, or may be produced in situ. Thus hydroxylamine or a salt thereof, such as the sulphate, may be pretreated with acetic acid or acetic anhydride or both, and the cyclohexanone and, if desired, additional sulphuric acid, run in together or separately in either order. Alternatively the hydroxylamine sulphate, ketone and acylating agents may be all mixed together with or without additional sulphuric acid and the whole heated up. To bring about the Beckmann rearrangement, temperatures of the order of 100–160° C. and especially about 120–130° C. or 140° C. may be used.

If the hydroxamic acid for use according to the present invention is prepared from hydroxylamine sulphate, then there is present one equivalent or one-half mole of sulphuric acid for each mole of hydroxylamine. Good results can be obtained in the transformation of cyclohexanone to lactam using this amount of sulphuric acid but better results are obtained by using additional sulphuric acid, for example another one-half mole or even up to three-quarters mole or more. As previously indicated, the present invention enables the process to be carried through with a limited amount of free sulphuric acid, for example up to 2 moles or 2½ moles of total sulphuric acid per mole of ketone and hydroxylamine. Preferably, however, smaller quantities are used, for example 1 mole to 1½ moles of sulphuric acid per mole of hydroxylamine and ketone.

Other acylating agents may be used instead of acetic anhydride or acetic acid or chloracetic acid, whether the hydroxamic acid is prepared in situ or pre-formed, for example anhydrides of other lower fatty acids, for example propionic acid or butyric acid.

At the end of the transformation to lactam or other amide the product may be worked up, if desired, by the usual methods, for example by neutralisation with ammonia or caustic soda or caustic potash, followed by separation and purification of the lactam or other amide. In this case it is desirable to extract the aqueous liquor from which the lactam has been separated, with a suitable extracting agent, for example chloroform or other chlorinated hydrocarbon. However, considerable advantages accrue from extracting the caprolactam or other amide from the reaction mixture without neutralisation, according to the process described in U. S. application S. No. 375,047 filed on even date herewith.

The following examples illustrate the invention but do not limit it in any way:

*Example 1*

20.5 parts of hydroxylamine sulphate, 108 parts of acetic acid and 24.5 parts of acetic anhydride were heated to reflux and stirred until the hydroxylamine sulphate had completely dissolved. 24.5 parts of cyclohexanone were then added gradually during 10 minutes. This resulted in a rapid exothermic reaction accompanied by slight darkening. The reaction temperature was about 125° C. and the reaction time about 10 minutes. The resulting mixture was cooled and the caprolactam worked up by the usual methods or by the method of U. S. application S. No. 375,047.

*Example 2*

22 parts of hydroxylamine sulphate were dissolved at reflux temperature in 86.5 parts of acetic acid and 25.5 parts of acetic anhydride. 24.5 parts of cyclohexanone and 12.25 parts of 98% sulphuric acid were then added simultaneously to the boiling mixture. Again the temperature was about 120° C. and the reaction was continued for 10–15 minutes. Again a good yield of lactam was obtained and was worked up by the usual method of neutralising followed by separation.

*Example 3*

22.4 parts of hydroxylamine sulphate, 40 parts of acetic acid, 60 parts of chloracetic acid, and 27 parts of acetic anhydride were heated together at reflux temperature until the hydroxylamine sulphate had completely dissolved. 24.5 parts of cyclohexanone were then added to the boiling mixture at a temperature of about 137° C., the reaction temperature being maintained for 10 minutes. The reaction mixture was worked up as before.

*Example 4*

18.72 parts of acethydroxamic acid acetate ($CH_3CONHOCOCH_3$)

12.25 parts of 98% sulphuric acid, 81 parts of acetic acid and 1 part of acetic anhydride were brought to boiling temperature and 24.5 parts of cyclohexanone added, the reaction taking place at about 123° C. for 7 minutes. Again the reaction mixture was worked up as before.

*Example 5*

22 parts of hydroxylamine sulphate, 43 parts of acetic acid, 60 parts of chloracetic acid and 27 parts of acetic anhydride were stirred and heated to 130° C. When the hydroxylamine sulphate had completely dissolved, 24.5 parts of cyclohexanone and 12.25 parts of 98% sulphuric acid were added simultaneously at a temperature of 135–140° C. during 8 minutes, which was the total reaction time. Again the caprolactam was worked up by the usual processes.

*Example 6*

22 parts of hydroxylamine sulphate, 12.25 parts of sulphuric acid, 43 parts of acetic acid, 60 parts of chloracetic acid and 27 parts of acetic anhydride were mixed together and heated under reflux at 130° C. When the hydroxylamine sulphate had completely dissolved, 24.5 parts of cyclohexanone were gradually added, the temperature being 138–140° C. and the reaction time 10 minutes.

*Example 7*

The reagents were mixed together and the reaction carried out as described in the preceding example with the exception that 24.5 parts of sulphuric acid were used and the reaction temperature was 125° C.

While the invention is of greatest value for the transformation of cyclohexanone to caprolactam, it may be employed in the transformation of other cyclic ketones to lactams, for example cycloheptanone to the corresponding lactam, or may be used for the transformation of acyclic ketones to amides, for example benzophenone to benzanilide and diethyl ketone to propionethylamide.

Having described our invention, what we desire to secure by Letters Patent is:

1. Process for the production of an amide from a ketone in a single operation, which comprises heating the ketone in a homogeneous mixture with an acid catalyst for the Beckmann transformation and a compound selected from the group which consists of lower acyl hydroxamic acids in which the acyl group contains up to 4 carbon atoms and salts of such hydroxamic acids, the heating being continued until the amide is formed.

2. Process according to claim 1, wherein the acyl hydroxamic compound is formed in situ.

3. Process for the production of a lactam from a cyclic ketone in a single operation which comprises heating the cyclic ketone with sulphuric acid and an acetyl derivative of hydroxamic acid to produce a homogeneous mixture and continuing the heating until the lactam is formed.

4. Process for the production of a lactam from a cyclic ketone in a single operation which comprises heating at 100–160° C. the cyclic ketone with sulphuric acid and an acetyl derivative of hydroxamic acid to produce a homogeneous mixture and continuing the heating until the lactam is formed.

5. Process for the production of a lactam from a cyclic ketone in a single operation which comprises heating the cyclic ketone with sulphuric acid and the product obtained by reaction between hydroxylamine and an acetylating agent until the lactam is formed.

6. Process for the production of a lactam from a cyclic ketone in a single operation which comprises heating the cyclic ketone with hydroxylamine sulphate and an acetylating agent until the lactam is formed.

7. Process for the production of a lactam from a cyclic ketone in a single operation which comprises heating at 100–160° C. the cyclic ketone with sulphuric acid, hydroxylamine sulphate and an acetylating agent until the lactam is formed.

8. Process for the production of a lactam from a cyclic ketone in a single operation, which comprises heating at 100–160° C. the cyclic ketone with sulphuric acid and acetic acid to produce a homogeneous mixture and continuing the heating until the lactam is formed.

9. Process for the production of a lactam from a cyclic ketone in a single operation, which comprises heating at 100–160° C. the cyclic ketone with sulphuric acid and both acetic acid and acetic anhydride to produce a homogeneous mixture and continuing the heating until the lactam is formed.

10. Process for the production of a lactam from a cyclic ketone in a single operation, which comprises heating at 100–160° C. the cyclic ketone with sulphuric acid and both acetic acid and chloracetic acid to produce a homogeneous mixture and continuing the heating until the lactam is formed.

11. Process for the production of caprolactam from cyclohexanone in a single operation which comprises heating cyclohexanone with sulphuric acid and an acetyl derivative of hydroxamic acid to produce a homogeneous mixture and continuing the heating until the caprolactam is formed.

12. Process for the production of caprolactam from cyclohexanone in a single operation which comprises heating at 100–160° C. cyclohexanone with sulphuric acid and an acetyl derivative of hydroxamic acid to produce a homogeneous mixture and continuing the heating until the caprolactam is formed.

13. Process for the production of caprolactam from cyclohexanone in a single operation which comprises heating cyclohexanone with sulphuric acid and the product obtained by reaction between hydroxylamine and an acetylating agent until the caprolactam is formed.

14. Process for the production of caprolactam from cyclohexanone in a single operation which comprises heating cyclohexanone with sulphuric acid, hydroxylamine sulphate and an acetylating agent until the caprolactam is formed.

15. Process for the production of caprolactam from cyclohexanone in a single operation which comprises heating at 100–160° C. cyclohexanone with sulphuric acid, hydroxylamine sulphate and an acetylating agent until the caprolactam is formed.

16. Process for the production of caprolactam from cyclohexanone in a single operation, which comprises heating at 100–160° C. cyclohexanone with sulphuric acid and acetic acid to produce a homogeneous mixture and continuing the heating until the caprolactam is formed.

17. Process for the production of caprolactam from cyclohexanone in a single operation, which comprises heating at 100–160° C. cyclohexanone with sulphuric acid and both acetic acid and acetic anhydride to produce a homogeneous mixture and continuing the heating until the caprolactam is formed.

18. Process for the production of caprolactam from cyclohexanone in a single operation, which comprises heating at 100–160° C. cyclohexanone with sulphuric acid and both acetic acid and chloracetic acid to produce a homogeneous mixture and continuing the heating until the caprolactam is formed.

References Cited in the file of this patent

UNITED STATES PATENTS

| | | |
|---|---|---|
| 2,423,200 | Moncrieff et al. | July 1, 1947 |
| 2,579,851 | Novotny | Dec. 25, 1951 |

FOREIGN PATENTS

| | | |
|---|---|---|
| 577,696 | Great Britain | May 28, 1946 |
| 894,063 | France | Mar. 6, 1944 |

OTHER REFERENCES

Karrer: "Org. Chem." (Elsevier) p. 497 (2nd ed., 1946).

Dunn et al.; Nature, vol. 164, p. 181 (1949).